(12) United States Patent
Li et al.

(10) Patent No.: US 10,218,239 B2
(45) Date of Patent: Feb. 26, 2019

(54) BRUSHLESS MOTOR HAVING TERMINAL FIXING BLOCKS

(71) Applicant: Bergstrom, Inc., Rockford, IL (US)

(72) Inventors: Gengxiang Li, Changzhou (CN); Kuilin Yang, Changzhou (CN); Lei Wang, Changzhou (CN)

(73) Assignee: BERGSTROM, INC., Rockford, IL (US)

( * ) Notice: Subject to any disclaimer, the term of this patent is extended or adjusted under 35 U.S.C. 154(b) by 221 days.

(21) Appl. No.: 15/210,570

(22) Filed: Jul. 14, 2016

(65) Prior Publication Data

US 2017/0018992 A1    Jan. 19, 2017

(30) Foreign Application Priority Data

Jul. 16, 2015  (CN) .......................... 2015 1 0420854

(51) Int. Cl.
 *H02K 1/00*  (2006.01)
 *H02K 3/52*  (2006.01)
(Continued)

(52) U.S. Cl.
 CPC ............. *H02K 3/522* (2013.01); *H02K 21/16* (2013.01); *H02K 29/03* (2013.01); *H02K 2201/03* (2013.01); *H02K 2213/03* (2013.01)

(58) Field of Classification Search
 CPC .... H02K 3/522; H02K 5/225; H02K 2201/03; H02K 2203/12
(Continued)

(56) References Cited

U.S. PATENT DOCUMENTS

| 4,982,124 A | * | 1/1991 | Cummings | ............ H01R 4/026 |
| | | | | 310/43 |
| 6,021,043 A | | 2/2000 | Horng | |

(Continued)

FOREIGN PATENT DOCUMENTS

CN        1652435 A     8/2005
CN      201388090 Y     1/2010
(Continued)

OTHER PUBLICATIONS

International Search Report and Written Opinion issued in counterpart International Patent Application No. PCT/US2016/042329 dated Sep. 30, 2016.
(Continued)

*Primary Examiner* — Hanh Nguyen
(74) *Attorney, Agent, or Firm* — Morgan Lewis & Bockius LLP

(57) ABSTRACT

A brushless motor includes a stator having a stator core; and an upper insulating bobbin connected to an upper face of the stator core, an upper surface of the upper insulating bobbin having a plurality of terminal fixing blocks and a plurality of wire through blocks, each terminal fixing block having a wire-through notch for positioning a wire and a terminal socket electrically connected with the wire. A first angle between a wire slot of each terminal fixing block and a radial direction of the upper insulating block is 50°-130°, and a second angle between a terminal socket of each terminal fixing block and a circumference direction of the upper bobbin is 50°-130°.

10 Claims, 15 Drawing Sheets

(51) Int. Cl.
*H02K 21/16* (2006.01)
*H02K 29/03* (2006.01)

(58) Field of Classification Search
USPC .......................................... 310/194, 71, 214
See application file for complete search history.

(56) References Cited

U.S. PATENT DOCUMENTS

| | | | |
|---|---|---|---|
| 6,072,261 A | 6/2000 | Lin | |
| 6,232,687 B1 | 5/2001 | Hollenbeck et al. | |
| 6,992,419 B2 | 1/2006 | Kim et al. | |
| 7,135,799 B2 | 11/2006 | Rittmeyer | |
| 7,385,323 B2 | 6/2008 | Takahashi et al. | |
| 7,626,303 B2 * | 12/2009 | Watanabe | H02K 3/522 310/194 |
| 7,663,285 B2 * | 2/2010 | Yumoto | H02K 3/522 310/194 |
| 7,732,969 B2 * | 6/2010 | Ishizeki | H02K 3/522 310/194 |
| 7,821,175 B2 | 10/2010 | Ionel et al. | |
| 7,932,658 B2 | 4/2011 | Ionel | |
| 7,965,012 B2 * | 6/2011 | Murakami | H02K 3/522 310/194 |
| 8,492,948 B2 | 7/2013 | Wang et al. | |
| 8,841,813 B2 | 9/2014 | Junak et al. | |
| 2003/0107290 A1 | 6/2003 | De Filippis | |
| 2004/0007934 A1 * | 1/2004 | Michaels | H02K 3/522 310/71 |
| 2004/0183388 A1 * | 9/2004 | Rittmeyer | H02K 3/28 310/179 |
| 2005/0231050 A1 | 10/2005 | Sasaki et al. | |
| 2007/0103014 A1 | 5/2007 | Sumiya et al. | |
| 2008/0106161 A1 * | 5/2008 | Matsuzaki | H02K 3/524 310/71 |
| 2009/0140590 A1 | 6/2009 | Hung | |
| 2010/0127591 A1 | 5/2010 | Court et al. | |
| 2011/0020154 A1 * | 1/2011 | Matsuda | H02K 1/148 417/410.1 |
| 2011/0316365 A1 | 12/2011 | Kim | |
| 2013/0181556 A1 | 7/2013 | Li et al. | |

FOREIGN PATENT DOCUMENTS

| | | |
|---|---|---|
| CN | 202094723 U | 12/2011 |
| CN | 204089494 U | 1/2015 |
| CN | 105071563 A | 11/2015 |
| CN | 105186726 A | 12/2015 |
| DE | 19942029 A | 3/2001 |
| JP | 2005033941 A | 2/2005 |

OTHER PUBLICATIONS

International Search Report and Written Opinion issued in related technology International Patent Application No. PCT/US2016/042314 dated Sep. 30, 2016.
International Search Report and Written Opinion issued in related technology International Patent Application No. PCT/US2016/042326 dated Sep. 27, 2016.
International Search Report and Written Opinion issued in related technology International Patent Application No. PCT/US2016/042307 dated Jul. 10, 2016.
Tyco Electronics Corporation, "MAG-MATE Connector With Multispring Pin," https://datasheet.octopart.com/1247003-2-TE-connectivity-datasheet-14918754.pdf, Jan. 2013.
Office Action dated Apr. 20, 2017 from the State Intellectual Property Office of the People's Republic of China in related Chinese application No. 201510420854.X.
Communication dated Jan. 3, 2019 from the European Patent Office in related European application No. 16825198.1.

* cited by examiner

BRUSHLESS MOTOR HAVING TERMINAL FIXING BLOCKS

The present invention claims the benefit of Chinese Patent Application No. 201510420854.X, filed in the People's Republic of China on Jul. 16, 2015, which is hereby incorporated by reference.

In addition, Chinese Application Nos. 201510420866.2, 201510419131.8, and 201510420136.2, all of which filed on Jul. 16, 2015, are hereby incorporated by reference.

BACKGROUND OF THE INVENTION

Technology Background

The present invention relates to a motor, and more particularly, to a brushless motor.

Discussion of the Related Art

A brushless motor is a motor without a brush and a commutator (or collecting ring). A brushless motor operates by changing the alternating frequency and the wave form of a current wave supplied to the coils of a rotor. Brushless motors are widely used by manufacturers in different sizes because of their high efficiency, low energy consumption, low noise, super long life, high reliability, servo controllability, stepless frequency conversion, speed regulating, low cost, and ease of use.

A brushless motor comprises a casing, a printed circuit board (PCB), a rotor and a stator. The stator includes an upper insulating bobbin, a stator core, a lower insulating bobbin, and a winding on the stator core defining a plurality of coils. The upper insulating bobbin and the lower insulating bobbin are installed respectively on the upper end face and the lower end face of the stator core. A lead wire winds the coil wound portion, which is formed by an upper slot insulation of the upper insulating bobbin, a tooth portion of the stator core and a lower slot insulation of the lower insulating bobbin. Thus, the wound lead wire forms a winding. The PCB is installed on the upper insulating bobbin and electrically connected to the winding.

However, the present inventors have identified a number of problems regarding existing brushless motors.

For example, when an insulation displacement connection terminal is used, a terminal fixing block on the upper insulating bobbin is located along the radial direction of the upper insulating bobbin and a terminal socket on the terminal fixing block is located along the circumference of the upper insulating bobbin so the puncture notch of the insulation displacement connection terminal is located along the radial direction of the upper insulating bobbin. As a result, when a lead wire is wound on the stator winding, the lead wire must be routed out along the radial direction of the upper insulating bobbin so the radial dimension of the stator is increased.

Further, a brushless motor may be a permanent magnet motor with fractional slot winding. This arrangement may reduce the slot area that is occupied by the insulating bobbin, thereby improving the actual slot filling factor of the stator winding, reducing the resistance of the winding, and improving the efficiency of the motor. However, the armature reaction of this arrangement includes higher harmonics, thereby increasing the iron loss of the motor. Moreover, a permanent motor with a fractional slot winding structure may be easily caused to have local magnetic saturation, thereby increasing of vibration and noise of the motor because of asymmetry of the magnetic circuit.

SUMMARY

Accordingly, the present invention is directed to a brushless motor that substantially obviates one or more of the problems due to limitations and disadvantages of the related art.

An object of the present invention is to provide a brushless motor with reduced radial dimension.

Another object of the present invention is to provide a brushless motor with reduced vibration and noise.

Another object of the present invention is to provide a brushless motor with reduced motor harmonic current and motor iron loss.

Another object of the present invention is to provide a brushless motor with high efficiency that can be easily manufactured.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a brushless motor comprises a stator having a stator core; and an upper insulating bobbin connected to an upper face of the stator core, an upper surface of the upper insulating bobbin having a plurality of terminal fixing blocks and a plurality of wire through blocks, each terminal fixing block having a wire-through notch for positioning a wire and a terminal socket electrically connected with the wire, wherein a first angle between a wire slot of each terminal fixing block and a radial direction of the upper insulating block is 50°-130°, and wherein a second angle between a terminal socket of each terminal fixing block and a circumference direction of the upper bobbin is 50°-130°.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to embodiments of the present invention, examples of which are illustrated in the accompanying drawings.

Figure 1:
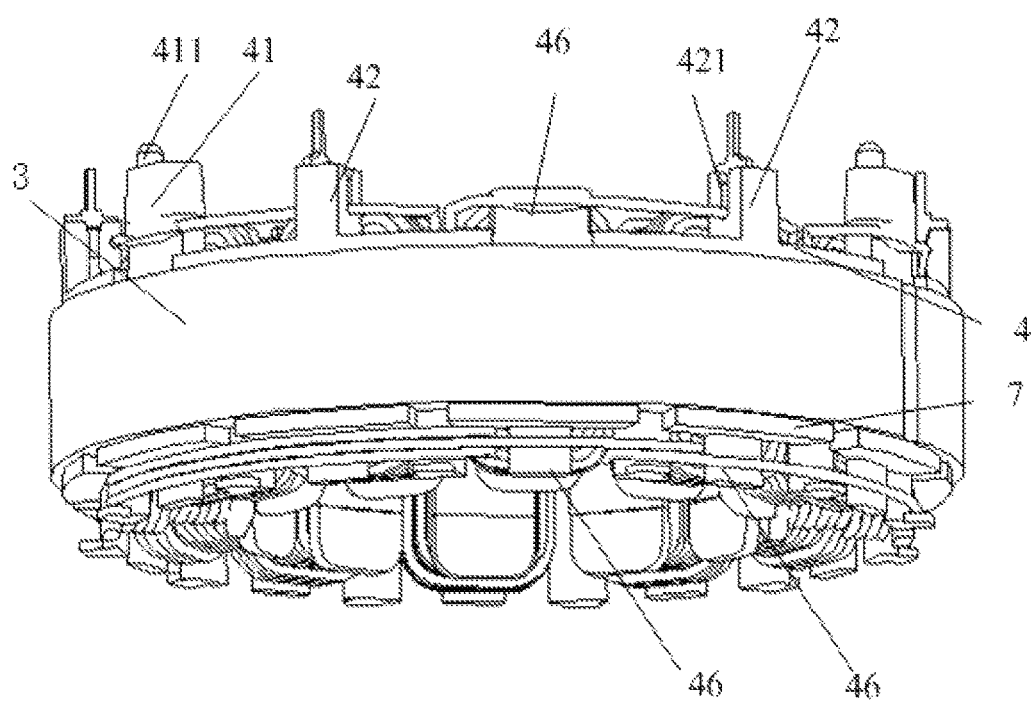
FIG. 1 is a perspective view showing the structure of a stator with an insulating bobbin according to an example embodiment of the present invention.
Figure 10:
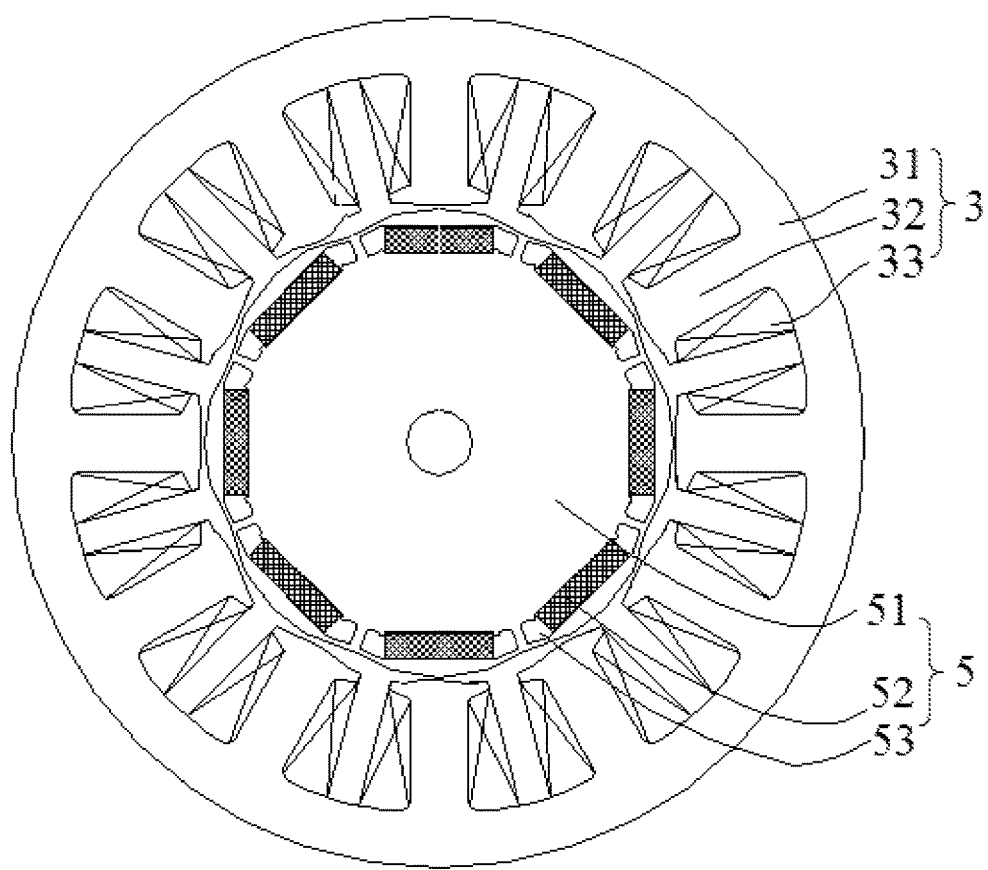
FIG. 10 is a diagram showing the combination structure of the stator and the rotor according to an example embodiment of the present invention.

As shown in the example of FIGS. 1 and 10, the brushless motor according to an example embodiment of the invention includes a stator 3 and a rotor 5. The stator 3 includes a stator core 31. The stator core 31 has plurality of tooth portions 32 that faces the rotor 5. The plurality of the tooth portions 32 may be distributed evenly on the stator core 31. The stator core 31 may have an upper insulating bobbin 4 and a lower insulating bobbin 7 installed on its upper and lower end face.

Figure 4:
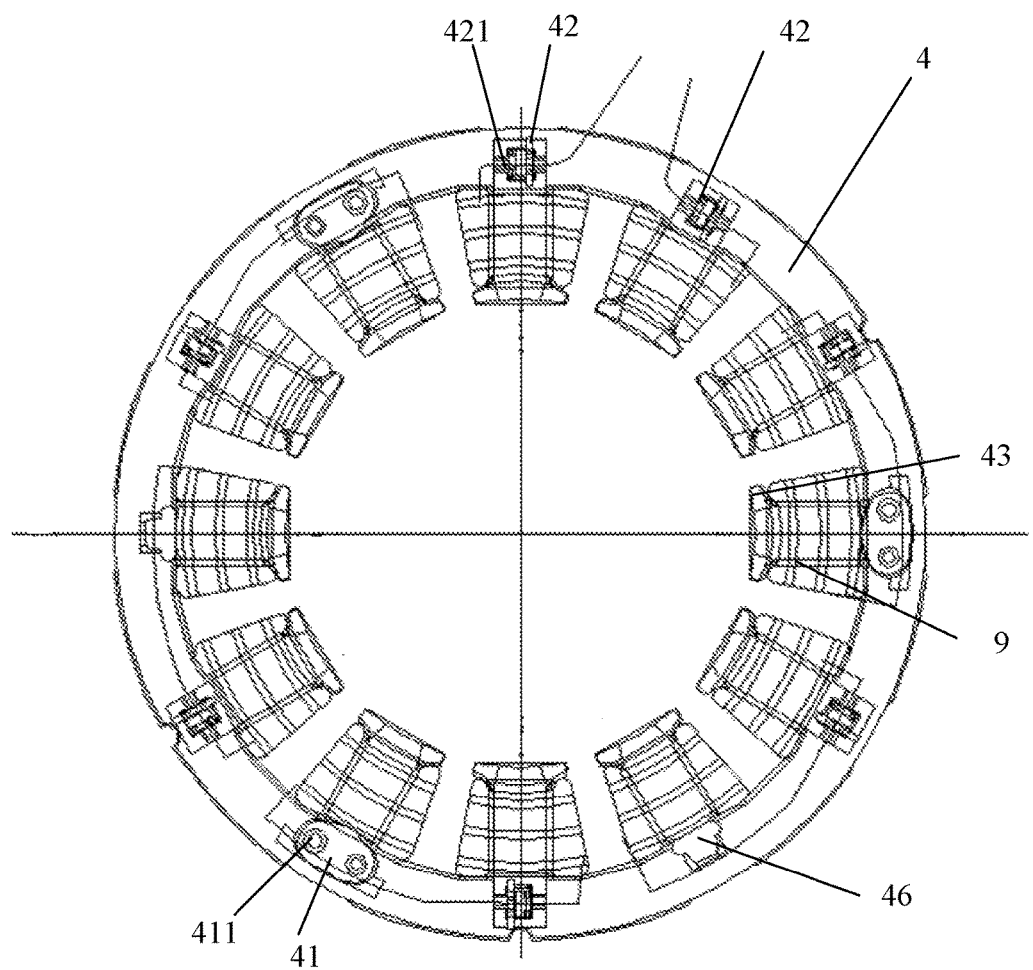
FIG. 4 is a top view showing the stator with the insulating bobbin according to the example embodiment of the present invention.
Figure 5:
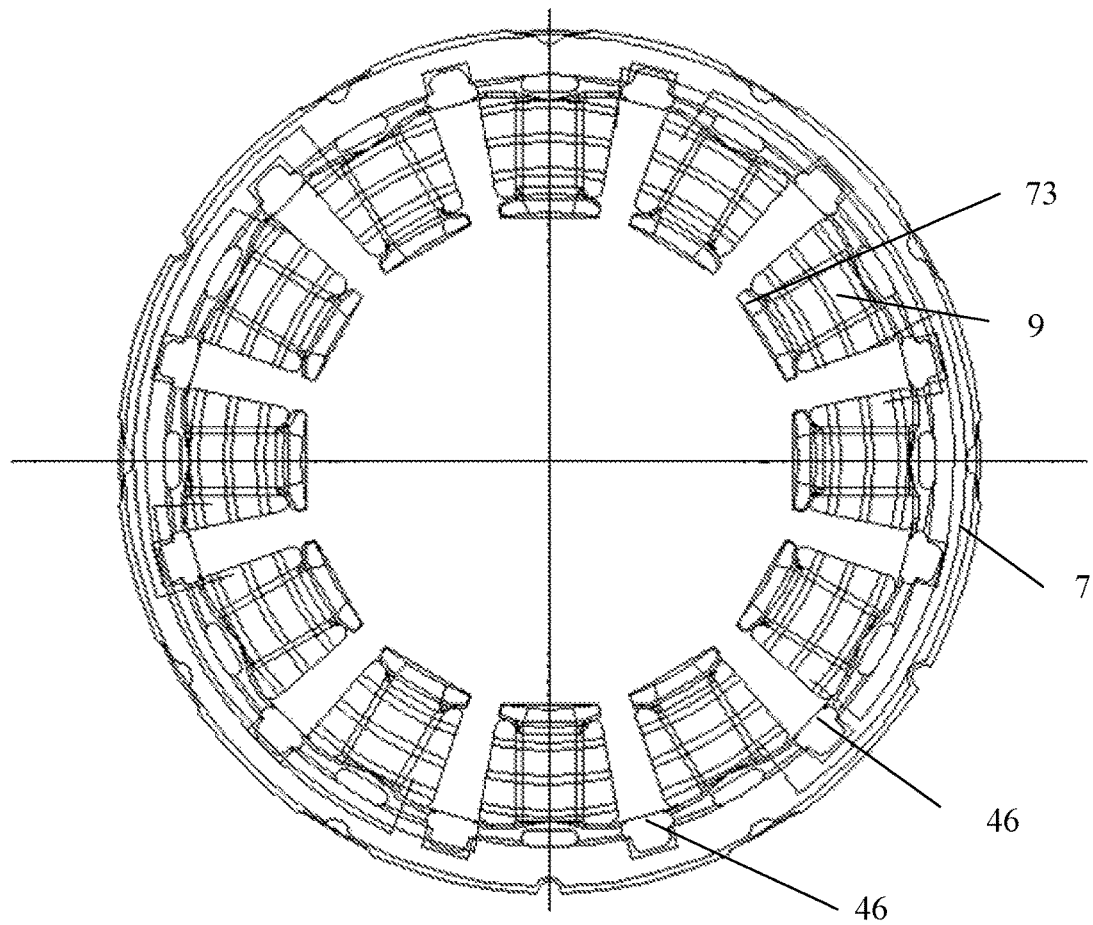
FIG. 5 is a bottom view showing the stator with the insulating bobbin according to the example embodiment of the present invention.
Figure 6:
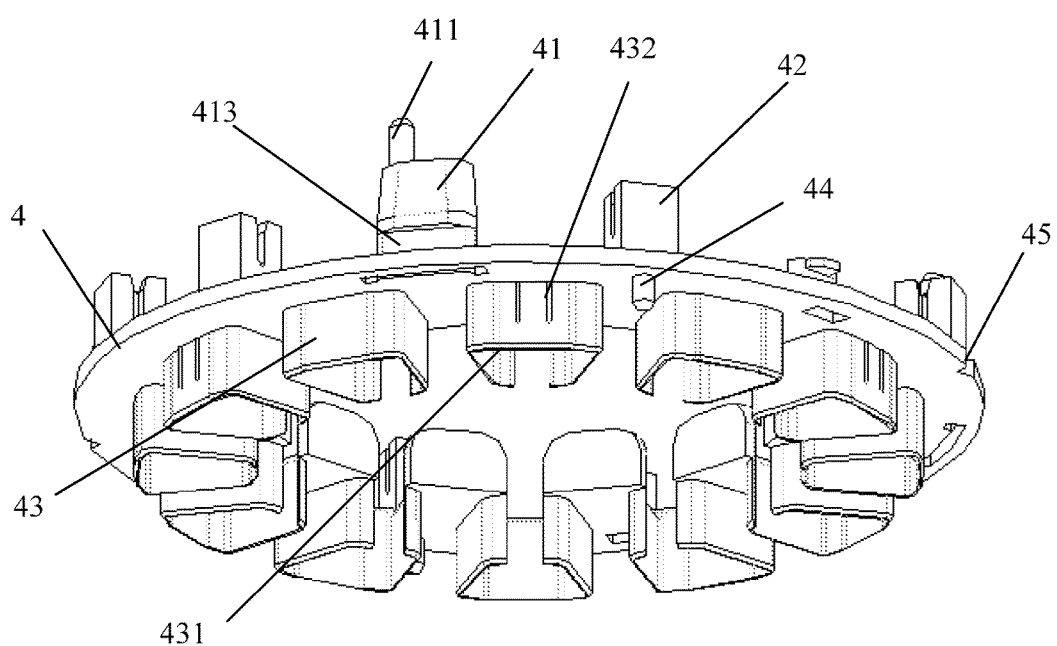
FIG. 6 is a perspective view showing the structure of the upper insulating bobbin according to the example embodiment of the present invention.

As shown in FIGS. 4 and 6, an upper slot insulation 43 on the upper insulating bobbin 4, the tooth portion 32 on the stator core 31, and a lower slot insulation on the lower insulating bobbin 7 together form a coil wound portion 9. The coil wound portion 9 has the winding 33 (of FIG. 10) wound thereon.

With reference to FIG. 10, the rotor 5 includes a rotor core 51 and a plurality of magnets 52. The magnets 52 may be provided in respective ones of a plurality of mounting slots 53 evenly located on the circumference direction of the rotor core 51. That is, each mounting slot 53 has a magnet 52 therein.

Figure 11:
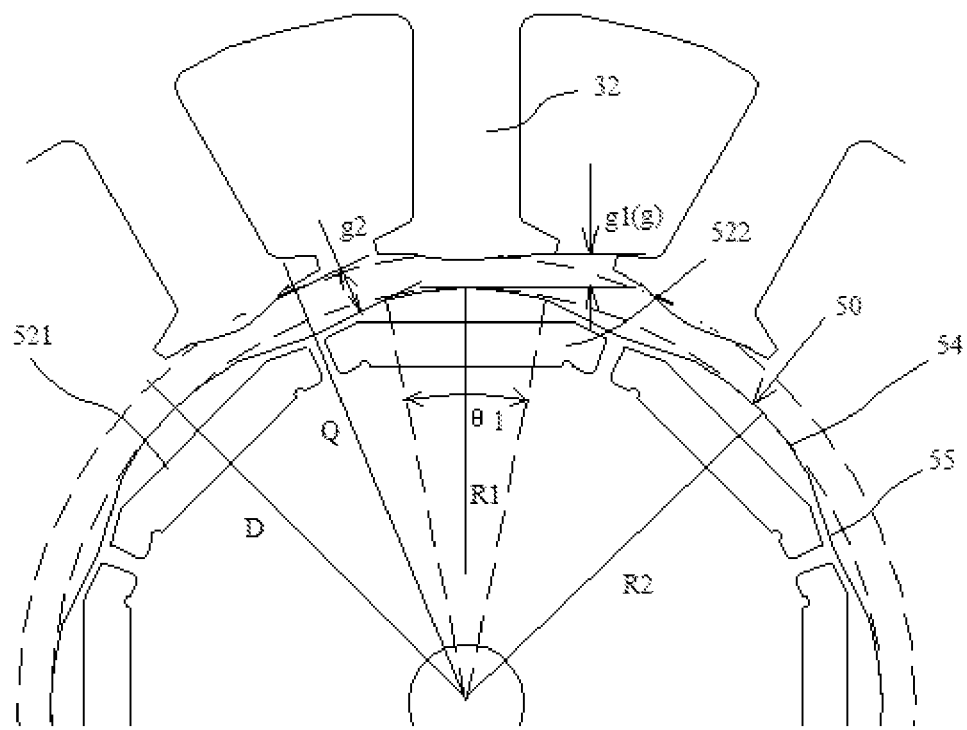
FIG. 11 is an enlarged view showing the local structure of the combination of the stator and the rotor according to the example embodiment of the present invention.

FIG. 11 shows an enlarged view of the rotor 5. Among the magnets 52, two adjacent ones of the magnets may be designated a first magnet 521 and a second magnet 522 for purposes of explanation. A first axis of symmetry D passes through the center of a magnet 52 (e.g., the first magnet 521) to a center of the rotor 5. A second axis of symmetry Q passes between adjacent magnets (e.g., between the first magnet 521 and the second magnet 522) to the center of the rotor 5. The distance g is defined between the outer surface/contour 50 of the rotor 5 to a side wall of adjacent tooth portion 32. As the rotor 5 rotates from a state with the second axis being aligned with the adjacent tooth portion 32 to a state with the first axis being aligned with the adjacent tooth portion, the distance g gets smaller.

Figure 2:
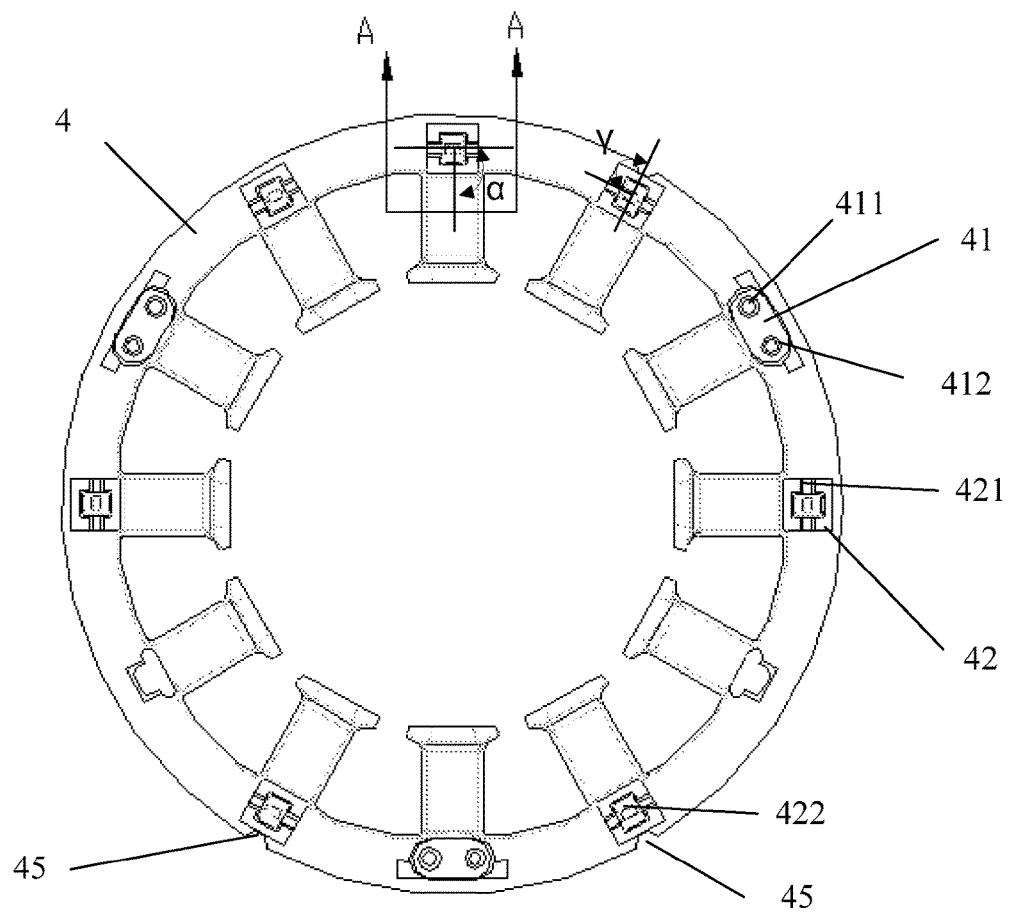
FIG. 2 is a top view showing an upper insulating bobbin according to the example embodiment of the present invention.

As shown in the example of FIGS. 1, 2 and 4, an upper surface of the upper insulating bobbin 4 includes a plurality of terminal fixing blocks 42 and a plurality of wire-through blocks 46. The wire-through notch 421 of the terminal fixing block 42 is located along a circumference direction of the upper insulating bobbin 4. A first angle α between the wire-through notch 421 and the radial direction of the upper insulating bobbin 4 is 50°-130°. The terminal socket 422 on the terminal fixing block 42 is located along the radial direction of the upper insulating bobbin 4. A second angle γ between the terminal socket 422 and a tangential (circumference) direction of the upper insulating bobbin 4 is 50°-130°. For example, the terminal socket 422 may extend substantially vertically to connect with the printed circuit board 2 of FIG. 9. In addition, the lower surface of the lower insulating bobbin 7 may include a plurality of wire-through blocks 46.

Figure 3:
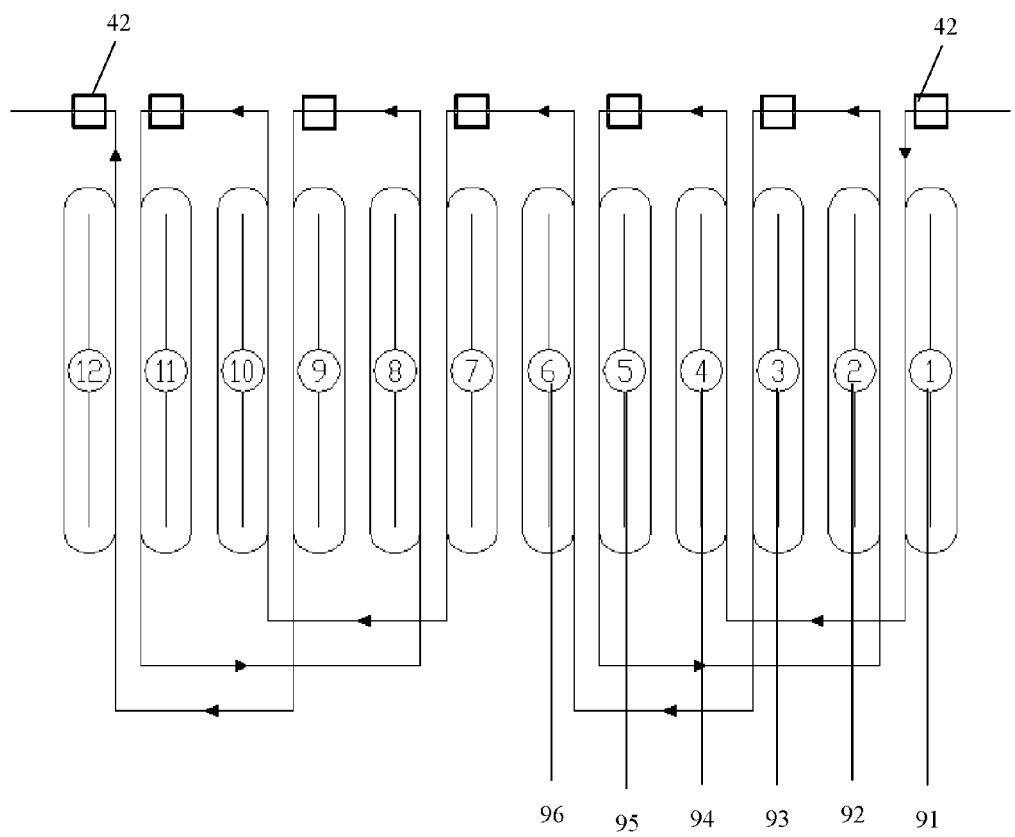
FIG. 3 is a diagram showing the coil wound structure of the winding according to an example embodiment of the present invention.

FIG. 3 shows an example a wire winding structure of the winding. According to FIG. 3, there is at least one group of the coil wound portion 9 on the stator core 5. Each group of coil wound portion 9 includes the first coil wound portion 91, the second coil wound portion 92, the third coil wound portion 93, the fourth coil wound portion 94, the fifth coil wound portion 95, and the sixth coil wound portion 96. A single piece of lead wire may be routed into the upper part of the first coil wound portion 91 and finishes winding the first coil wound portion 91. Then, the lead wire may be is routed out of the lower part of the first coil wound portion 91 and into the lower part of the fourth coil wound portion 94. After finishing winding the fourth coil wound portion 94, the lead wire may be routed out of the upper part of the fourth coil wound portion 94 and into the upper part of the fifth coil wound portion 95. After finishing winding the fifth coil wound portion 95, the lead wire may be routed out of the lower part of the fifth coil wound portion 95 and into the lower part of the second coil wound portion 92. After finishing winding the second coil wound portion 92, the lead wire may be routed out of the upper part of the second coil wound portion 92 and into the upper part of the third coil wound portion 93. After finishing winding the third coil wound portion 93, the lead wire may be routed out of the lower part of the third coil wound portion 93 and into the lower part of the sixth coil wound portion 96. After finishing winding the sixth coil wound portion 96, the lead wire may be routed out of the upper part of the sixth coil wound portion 96. Here, the coil wound portions 9 of two adjacent groups are connected by their upper parts.

According to the example embodiment, the coil wound portions 9 of adjacent groups are connected by their upper parts, which means the lead wire routed out of the upper part of the sixth coil wound portion of a group coil wound portion 9 is routed into the upper part of the first coil wound portion 91 of adjacent group of coil wound portion 9. For example, in FIG. 3, the coil wound portion 9 which is marked 1-6 is one group of coil wound portions 9. (The first coil wound portion 91 is marked 1. The second coil wound portion 92 is marked 2 and so on.) According to the example embodiment, after the group of coil wound portion 9 which is marked 1-6 finishes winding as per the method mentioned above, the lead wire is routed out of the upper part of the sixth coil wound portion 96 which is marked 6 and routed into the upper part of the first coil wound portion 91 which is marked 7.

According to the example embodiment, coil wound portion 9 of the stator may be wound as per the method described above. As such, all coils of the winding can be wound by a single piece of lead wire so that wire winding operations can be reduced. Moreover, adjacent coil wound portions 9 can share one terminal fixing block 42 so that fewer terminals are needed. Further, the lead wire is routed in or routed out through upper and lower parts of the coil wound portion 9. That is, the lead wire is routed through both faces so that the space at both ends of the stator can be best utilized and the internal space of the brushless motor may be properly used, thereby permitting easy and convenient arrangement of other components.

The terminal fixing block 42 on the upper insulating bobbin 4 may be located along the radial direction of the upper insulating bobbin 4 and the terminal socket 422 on the terminal fixing block 42 may be located along the circumference direction of the upper insulating bobbin 4 during the forming process of the related art winding so the puncture notch of the insulation displacement connection terminal is located along the radial direction of the upper insulating bobbin. In this manner, the lead wire is routed out along the radial direction of the insulating bobbin 4 when the winding is wound by the lead wire so that the radial dimension of the stator is increased. However, according to this example embodiment, the wire-through notch 421 of the terminal fixing block 42 on the upper insulating bobbin 4 is located along the circumference direction of the upper insulating bobbin 4 and the terminal socket 422 on the terminal fixing block 42 is located along the radial direction of the upper insulating bobbin 4. In this manner, the puncture notch 82 of the insulating displacement connection terminal 8 is located along the circumference direction of the upper insulating bobbin 4 so that the lead wire can be located along the circumference direction of the upper surface of the upper insulating bobbin 4 when the winding is wound by the lead wire to reduce the radial dimension of the stator.

Optionally, according to FIGS. 6 and 2, the upper insulating bobbin 4 may include a plurality of locating bosses 41 evenly distributed along the circumference direction of the upper surface of the upper insulating bobbin 4. The top surface of the locating boss 41 is higher than the top surface of the terminal fixing block 42 with respect to the upper surface of the upper insulating bobbin 4 by an amount greater than zero. The terminal socket 422 of the terminal fixing block 42 may have an insulation displacement connection (IDC) terminal installed.

After the upper insulating bobbin 4, the lower insulating bobbin, and the stator core are assembled together, the coil wound portion that is formed by the upper slot insulation 43 on the upper insulating bobbin 4, the tooth portion of the stator core and the lower slot insulation of the lower insulating bobbin are wound to form the winding and the complete stator eventually. The electrical connection between the circuit on the printed circuit board (PCB; shown in FIG. 9) and the lead wire of the winding are realized by a terminal which is the insulation displacement connection terminal. One end of the terminal has a contact pin which goes into the terminal connecting hole on the PCB. Another end of the terminal goes into the terminal fixing block 42 on the upper insulation bobbin 4 and punctures the insulation layer of the lead wire that passes through the terminal fixing block 42 to realize the electrical continuity between the lead wire and the PCB.

According to the example embodiment, the structure can prevent the circuit on the PCB from being damaging if the terminal goes into the PCB too deep and also prevent electrical circuit discontinuity if the terminal does not completely go into the PCB by optimizing the height difference between the top surface of the locating boss 41 and the top surface of the terminal fixing block 42.

Figure 7:
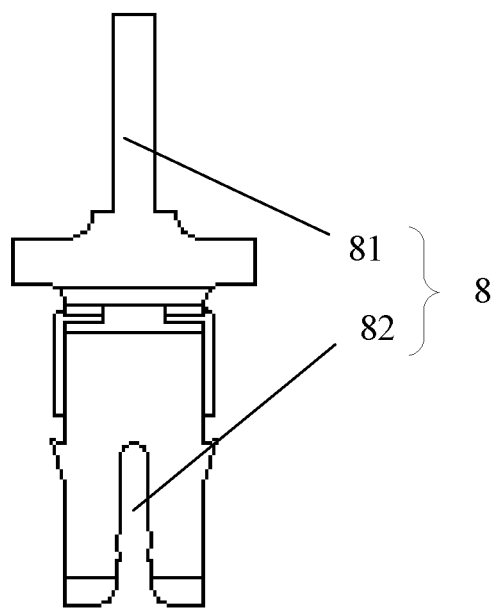
FIG. 7 is a view showing the structure of the MAG Mate Multispring terminal according to an example embodiment of the present invention.

For example, FIG. 7 shows an example terminal socket 422 using the structure of a MAG Mate Multispring terminal. In this configuration, the height difference between the top surface of the locating boss 41 and the top surface of the terminal fixing block 42, as mentioned above, may be 1-5 millimeters.

According to this configuration, one end of MAG Mate Multispring terminal 8 has a contact pin 81 with multiple springs. The contact pin 81 is inserted into the terminal connecting hole on the PCB 2 of FIG. 9. The other end of MAG Mate Multispring terminal 8 has puncture notch 82 which is in the same direction as the wire-through notch 421. When the other end of MAG Mate Multispring terminal 8 is inserted into the wire-through notch 421 of the terminal fixing block 42, the puncture notch 82 closes and the MAG Mate Multispring terminal 8 punctures the insulation layer of the lead wire passing through the puncture notch 82 directly to realize electrical continuity between the lead wire and the PCB 2 of FIG. 9. The MAG Mate Multispring terminal 8 can realize the electrical connection between the lead wire and the PCB without pre-stripping wire or soldering, thereby simplifying the manufacturing process and facilitating automatic production. As mentioned above, the height difference between the top surface of the locating boss 41 and the top surface of the terminal fixing block 42 can be 1-5 millimeters to work with MAG Mate Multispring terminal 8 to prevent damage of the circuit on the PCB if the terminal goes too deep into the PCB and also prevents circuit discontinuity if the terminal does not go completely into the PCB.

Figure 9:
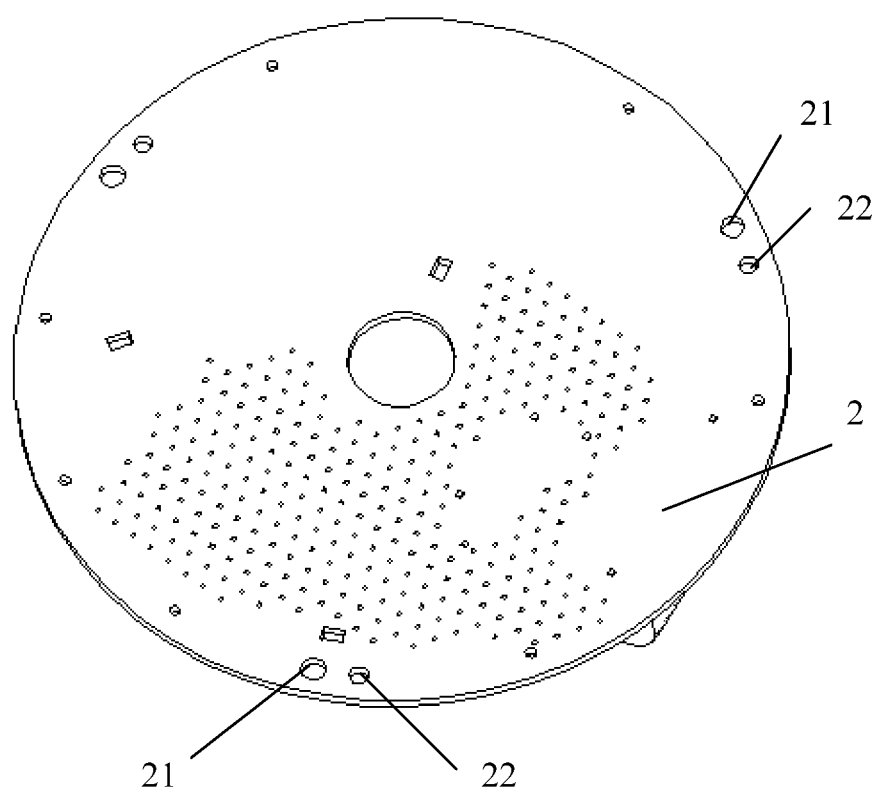
FIG. 9 is a bottom view showing a printed circuit board (PCB) according to an example embodiment of the present invention.

FIG. 9 shows a bottom view of an example printed circuit board (PCB). Optionally, as shown in FIG. 6 and FIG. 9 show that the top surface of each locating boss 41 has a locating column 411 that cooperates with the locating hole 21 on the PCB 2. The end of the locating column 411 that works with the locating hole is tapered.

According to the example embodiment, when the PCB 2 is assembled with the upper insulating bobbin 4, the locating column 411 on the locating boss 41 will work with the locating hole 21 on the PCB 2 first so that a positional error of the terminal connecting hole on the PCB 2 with respect to the terminal 8 on the upper insulating bobbin 4 is reduced. The end of the locating column 411 that is inserted into the locating hole 21 can be tapered so the locating column 411 can adjust more easily when it is inserted into the locating hole 21 even if there is a deviation in position. Furthermore, the taper can expedite the automatic assembly of the PCB and the upper insulating bobbin 4, increase production efficiency and reduce the quantity of the rejects found in automatic production process.

Optionally, in accordance with FIGS. 2 and 9, the top surface of each locating boss 41 may have a fixing hole 412 that cooperates with a corresponding mounting hole 22 on the PCB 2 and fixed via a screw (not shown). According to this arrangement, after the PCB is assembled with the upper insulating bobbin 4, it can prevent looseness or disconnection between the PCB 2 and the upper insulating bobbin 4 and improve the stability of the brushless motor during operation by fixing the fixing hole 412 and the mounting hole.

Optionally, as shown in FIG. 6 each locating boss 41 may have a wire-through slot 413 for positioning a lead wire on its side wall facing the outside edge of the upper insulating bobbin 4. According to this arrangement, when the upper insulating bobbin 4 is wound, multiple wire-through blocks for positioning the lead wire may be provided on the upper surface of the upper insulating bobbin 4. Each locating boss 41 has wire-through slot 413 for positioning lead wire on its side wall facing the outside edge of the upper insulating bobbin 4 so that the locating boss 41 can position the lead wire. Furthermore, the locating boss 41 can be used to replace some of the wire-through blocks 42. In this way, the number of the wire-through blocks 42 on the upper insulating bobbin 4 can be reduced, thereby simplifying the structure of the upper insulating bobbin 4 and reducing production cost.

Figure 8:
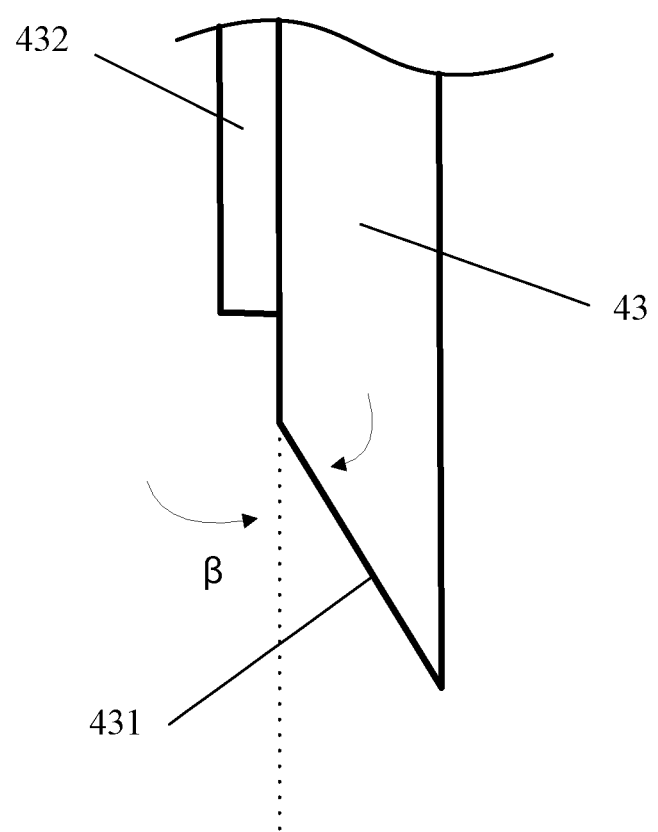
FIG. 8 is a view showing the local structure of the upper slot insulation on the upper insulating bobbin according to the example embodiment of the present invention.

Optionally, as shown in FIG. 6 the lower end of the upper slot insulation 43 on the upper insulating bobbin 4 may be sloped to define an error proofing slope 431 on the lower end of the upper slot insulation 43. FIG. 8 further shows the structure of the upper slot insulation 43. The error proofing slope 431 may be sloped back towards the centre of the upper insulating bobbin 4.

FIG. 8 shows that the slope angle β between the error proofing slope 431 and the plane where the outer side of the upper slot insulation 43 is located is 10°-60°.

In accordance with this arrangement, the lower part of the upper slot insulation 43 will be inserted into the stator core when the upper insulating bobbin 4 is assembled with the stator core. However, since dimension error and assembly error may exist during the manufacturing process, positional deviation may occur when the upper slot insulation 43 is inserted into the stator core so not all can be inserted successfully. However, when the end of the upper slot insulation 43 having the error proof slope 431 is inserted into the stator core, the upper slot insulation 43 can automatically adjust its position to be inserted into the stator core with an improved success rate and improved efficiency in automatic assembly. Here, the working efficiency and the success rate of insertion can be improved by optimizing the angle β between the error proof slope 431 and the outer side of the upper slot insulation 43.

In yet another optional aspect, as shown in FIG. 6, the outer side of the lower part of the upper slot insulation 43 on the upper insulating bobbin 4 may have at least one anti-slip rib 432. The anti-slip rib 432 may be located vertically along the outer side of the upper slot insulation 43. The anti-slip rib 432 can prevent looseness or disconnection between the upper slot insulation 43 and the stator core after they are assembled, thereby improving stability of the winding structure. The configuration of the anti-slip rib 432 can be varied to optimize performance, thereby achieving stronger reliability of the assembly of the upper slot insulation 43 and the stator core.

In yet another optional aspect, as shown in FIG. 6, at least one anti-slip column 44 may be provide along the circumference direction of the lower surface of the upper insulating bobbin 4. The anti-slip column 44 may project perpendicularly from the lower surface of the upper insulating bobbin 4. Here, an interference fit between the anti-slip column 44 and the stator core can further prevent looseness and disconnection between the upper insulating bobbin 4 and the stator core after they are assembled.

In yet another optional aspect, as shown in FIG. 6, a plurality of recesses 45 may be provided on the side wall of the upper insulating bobbin 4. Here, the plurality of recesses 45 on the side wall of the upper insulating bobbin 4 as a further safeguard to prevent the upper insulating bobbin 4 from being assembled reversely with the stator core. The plurality of recess 45 may be distributed unevenly on the side wall of the upper insulating bobbin 4. For example, three recesses 45 can be used with two being located symmetrically on the side wall of the upper insulating bobbin 4 and the third being closer to one of the previous two recesses. By this asymmetry, the recesses 45 can safeguard against the upper insulating bobbin 4 being installed reversely.

As discussed above with respect to FIG. 11, the distance g between an outer surface 50 of the rotor 5 and the opposing tooth portion 32 varies as the stator core rotates. As shown, when the rotor 5 rotates from a state with the second axis Q being aligned with the opposing tooth portion 32 to a state with the first axis being aligned with the adjacent tooth portion, the distance g gets smaller. As a result, the cogging torque of the motor and the torque ripple are reduced effectively during motor operation. Also, any rapid change and a saturation degree of the flux passing through the tooth tip of the stator are restrained effectively during operation, thereby reducing an amplitude of a radial electromagnetic force. Further, this configuration may reduce vibration and noise of the motor. Moreover, because the distance g becomes smaller as described above, a counter electromotive force generated by the motor substantially becomes a sine wave, thereby reducing the harmonics of the motor and reducing iron loss of the motor.

Figure 12:
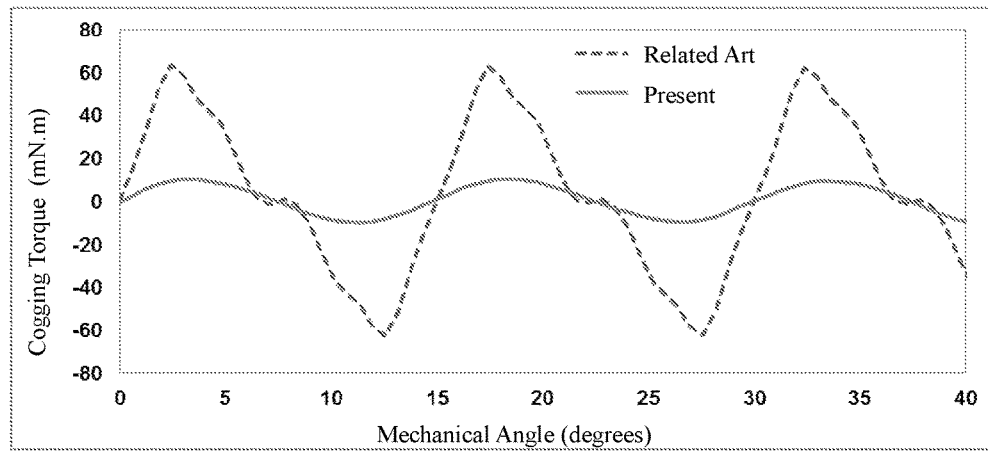
FIG. 12 is a plot showing the cogging torque of the brushless motor changing with the mechanical angle according to an example embodiment of the present invention.

FIG. 12 is a graph showing change in the cogging torque according to mechanical angle when a stator and rotor combination is used in the motor. FIG. 12 shows the cogging torque according to the mechanical angle of the stator relative to the rotor. In FIG. 12, the solid line represents a motor according to an example embodiment of the present invention whereas the dotted line represents a related art motor design. A cogging torque closer to zero is generally better. Therefore, with regard to tooth space torque, the motor according the example embodiment of the present invention has better performance than the related art motor.

Figure 13:
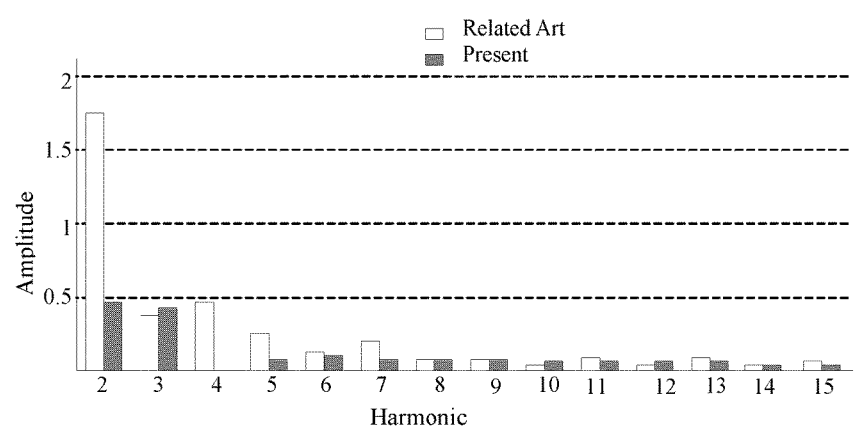
FIG. 13 is a bar graph showing the distribution of the radial electromagnetic force amplitudes corresponding to different harmonics of a brushless motor according to an example embodiment of the present invention.

FIG. 13 is a bar graph showing different harmonic waves related to a radial magnet force distribution when a stator and rotor combination is used in the motor. Specifically, FIG. 13 shows different harmonics related to a radial magnet force distribution diagram for a stator and rotor combination in a motor. The cross-hatched columns represent a motor in accordance with an example embodiment of the present invention wherein the hollow columns represents a related art motor. The harmonics amplitudes for the present motor are less than those of the related art motor. Thus, motor vibration and noise are effectively restrained in the motor according to the example embodiment of the present invention.

Figure 14:
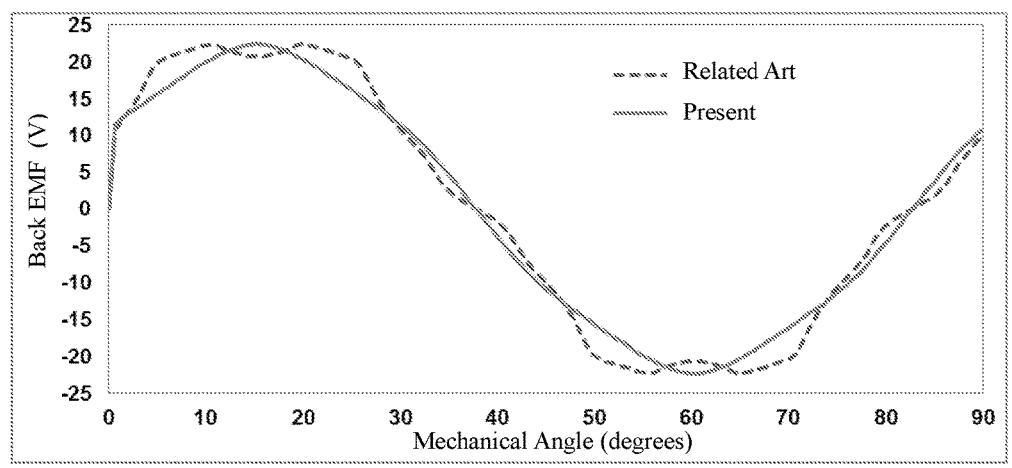
FIG. 14 is a plot showing the counter electromotive force of the brushless motor changing with the mechanical angle according to an example embodiment of the present invention.

FIG. 14 is a graph showing the back electromotive force (counter electromotive force) changing with mechanical angle of the motor when a stator and rotor combination is used in the motor. In FIG. 14, the solid line represents an example embodiment of the present invention whereas the dotted line represents a related art motor design. As clearly shown in FIG. 14, the back electromotive force of the present motor is a sine wave whereas the back electromotive force for the related art motor is an irregular. Because a back electromotive force with a sine wave (rather than an irregular wave) is achieved, both current harmonics and iron loss are reduced in the motor. Moreover, because the back electromotive of the present motor has much less high-frequency harmonics, position can be more conveniently detected.

With reference to FIG. 11, a distance g2 is defined from the outer surface 50 of the rotor 5 along the second axis Q to the side wall of the adjacent winding tooth 32. Similarly, a distance g1 is defined from the outer surface 50 of the rotor 5 along the first axis D to the side wall of the adjacent winding tooth 32. Here, distances g1 and g2 satisfy a relationship such that $1.5 \leq g2/g1 \leq 3.5$. That is, variation of the distance g is limited by limiting a ratio between a maximum of g2 and a minimum of g1, thereby controlling motor vibration and noise, and reducing motor iron loss.

In one configuration, the outer surface 50 of the rotor 5 may comprise alternating circular arcs 54 and curved inwards V shapes 55. The circular arc segments 54 and V segments 55 may be connected smoothly. The first axis passes through a center of the circular arc segments 54, and the second axis Q passes through the center of the V segments 55. In another configuration, the outer surface 50 of the rotor 5 may have other arrangements, for example, using V segments 55 of straight line segments. Since side wall of winding tooth 32 may certain radius or curvature, straight line segments can also meet above distance g range in various ways. For example, the V segments 55 can be arc segments that rise above the center of the rotor 5 to meet the distance g range in various ways. There are many alternative configurations that can meet the distance g range in various way not listed here. However, it is generally desired that the arc segments 54 and the V segments 55 are connected smoothly to meet the distance g range with an effectively variation amplitude so that a motor is achieved with reduced motor vibration, noise, motor iron loss.

In FIG. 11, arc segment 54 has a radius R1, and the distance from outer surface 50 to the center of the rotor 5 along the first axis D is R2 such that R1<R2 and R1>0. Further, the arc segment 54 defines an angle $\theta 1$, and the rotor 5 has a number P of poles (magnets) such that $0.444 \leq \theta 1/(360°/P) \leq 0.665$ and P is a natural number.

Specifically, if the distance variation range between the side wall of the adjacent winding tooth 32 and each point on arc segment 54 adopting R1 and $\theta 1$ as set forth, motor vibration, noise, motor iron loss may be reduced.

Figure 15:
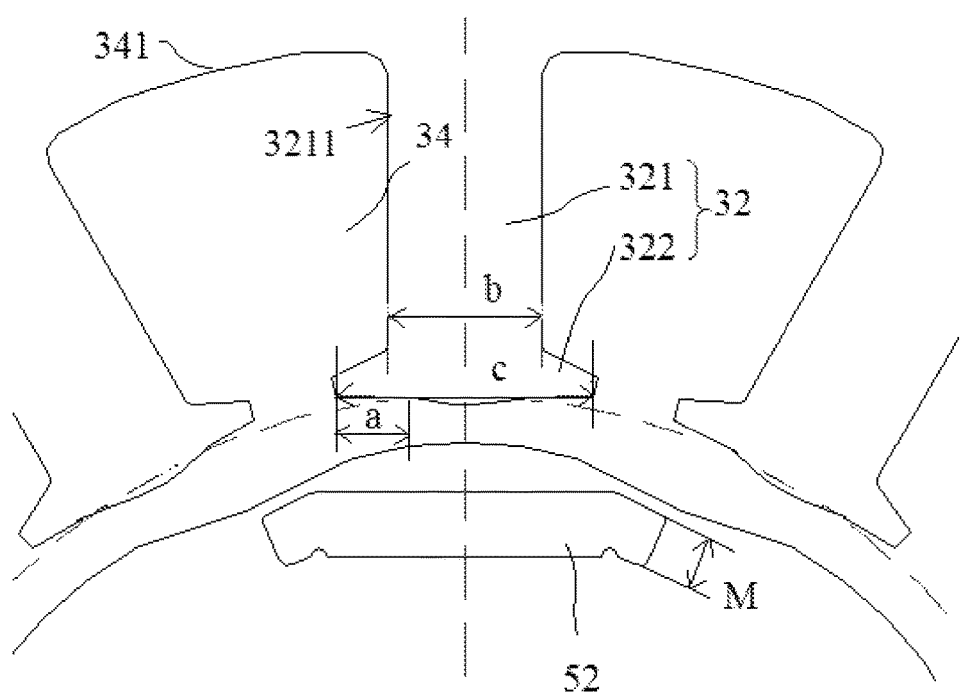
FIG. 15 is an enlarged view showing the local structure of the combination of the stator and the rotor of FIG. 10.

FIG. 15 is an enlarged partial diagrammatic view showing the stator and rotor combination. As shown in FIG. 15, a winding tooth 32 may comprise a winding portion 321 and front portion 322. Here, the surface of the front portion 322 can be straight or curved. To increase the distance variation range between the side wall (i.e., the front portion 322) of the winding tooth 32 and point on outer surface 50 of the rotor 5, a contoured front portion 322 may be used. The contoured front portion 322 includes an arc segment at the center part and two straight line segments connected to respective ends of the arc segment. In the illustrated embodiment, the distance c is defined between two endpoints of the contoured front portion 322 (i.e., a width of the front portion 322). Each straight line segment has a length a. The winding portion 321 has a width b. Here, these dimensions satisfy a relationship: $(c-b)/2 \leq a \leq c/2$ where a, b, and c are greater than zero. The relative dimensions of a, b, and c as described can provide a sufficient arc segment length for the front portion 322 such that a sufficient variation in distance g is provided.

In the example of FIG. 15, two adjacent winding teeth 32 has a stator slot 34 in between. The base 341 of the stator slot 34 described herein comprises the arc segment of the stator slot and two straight lines of the stator slot connecting two ends of the arc segment of the stator slot described herein. The straight line segment of the stator slot is perpendicular to the side line 3211 of the winding portion 321 and the straight line segment of the stator slot is connected with the side line 3211 smoothly. Of course, in other configurations, the base 341 of the stator slot 34 can be composed by only an arc segment or by only a straight line segment.

In variations in accordance with the present invention, the rotor core 51 can include rotor lamination with multiple layers stacked together. The stator core 31 can include the stator lamination of multiple layers stacked together. Herein, the lamination can be magnetic conductive steel sheets.

Figure 16:
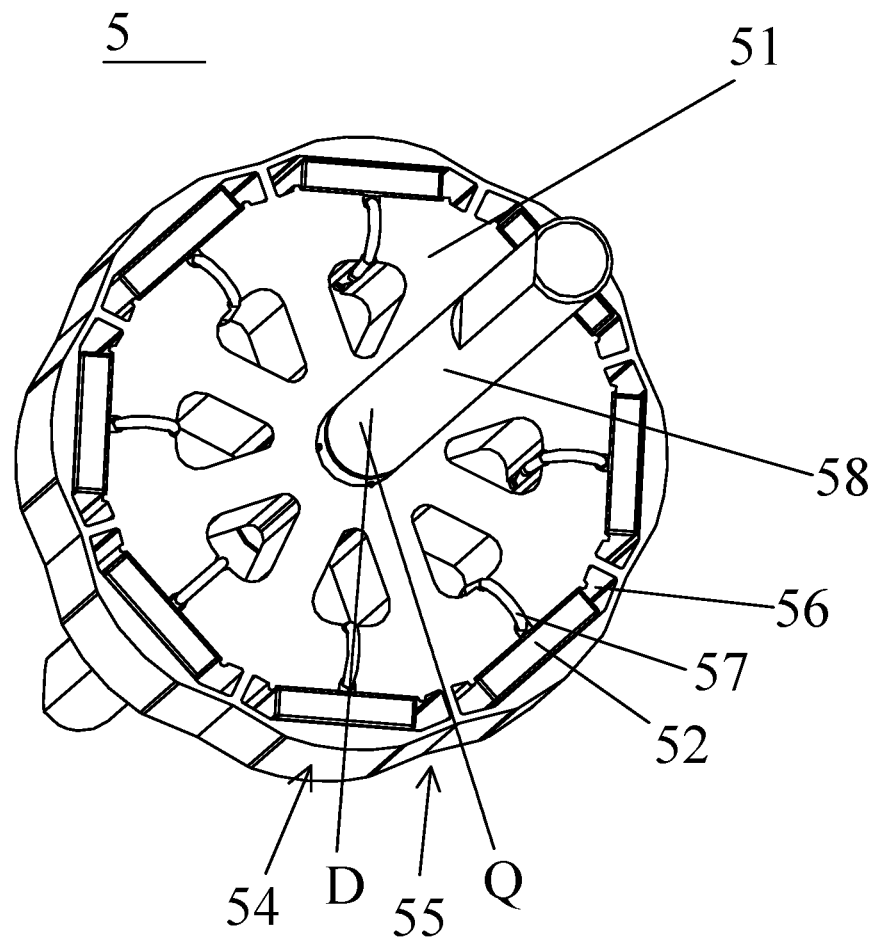
FIG. 16 is a perspective view showing the structure of the rotor in the combination structure of the stator and the rotor according to FIG. 10.

In accordance with FIGS. 15 and 16, the length of assembly slot 53 may be larger than that magnet 52. Here, the magnet 52 may be at the center of assembly slot 53 and the two sides of assembly slot 53 may have flux barrier 56 composed by non-magnetic zone. The width M of magnet barrier 56 is 1.5-3.0 times of rotor lamination thickness. The above design may ensure mechanical strength, meanwhile set width M of magnet barrier 56 is 1.5-3.0 times of rotor lamination thickness. This arrangement effectively restrains a magnetic field short circuit that may be formed by a magnetic field produced from magnet passing through the winding tooth 32 and flux barrier 56, thereby achieving increased magnet utilization and motor efficiency.

In the above example configuration, the number of winding teeth 32 and the number of poles in the rotor 5 has a ratio of 3:2. (Specifically, here 12:4 which reduces to 3:2.) Therefore, the example configuration can effectively increase stator slot utilization by adopting fractional-slot design for stator and rotor combination structure. Of course, this ratio represent only an example configuration, the ratio between the number of winding teeth 32 and the number of poles in the rotor 5 can have other values. Further, the number of winding teeth 32 and the number of poles in the rotor 5 can be determined in accordance with actual design and manufacturing demands.

FIG. 16 is perspective view showing a rotor 5 in accordance with an example embodiment. As shown in FIG. 16, the magnet 52 may be fastened into the assembly slot 53 by a fastener 57, such as a clip. Furthermore, the rotor 5 may also comprise a shaft 58 with the rotor core 51 therearound. Alternatively, other arrangements may be used to fasten the magnets. For example, the magnet 52 may be secured into the assembly slot 53 by endcaps (not shown) on each side of the rotor so that the magnet cannot shift along the axial direction. The endcaps may be made of stainless steel to avoid a flux leakage path.

In accordance with the example embodiments described herein, the distance from an outer surface of the rotor to a side wall of adjacent tooth portion is configured to vary. As a result, cogging torque of the motor and the torque ripple during operation are reduced. Further, the rapid change and the saturation degree of the flux passing through the tooth tip of the stator are restrained. Moreover, amplitudes of radial electromagnetic forces are reduced, thereby preventing the vibration and the noise of the motor. Additionally, a back electromotive force generated by the motor is substantially a sine wave, thereby reducing harmonics of the motor and reducing iron loss of the motor. In other aspects, a wire-through notch of the terminal fixing block on the upper insulating bobbin is located along the circumference direction of the upper insulating bobbin and the terminal socket on the terminal fixing block is located along the upper insulating bobbin. As a result, a puncture notch of the insulation displacement connection terminal can be located along the circumference direction of the upper insulating bobbin so that the lead wire can be located along the circumference direction of the upper surface of the upper insulating bobbin when the winding is wound by the lead wire. Further, the radial dimension of the stator can be greatly reduced.

It will be apparent to those skilled in the art that various modifications and variations can be made in the brushless motor of the present invention without departing from the spirit or scope of the invention. Thus, it is intended that the present invention cover the modifications and variations of this invention provided they come within the scope of the appended claims and their equivalents.

What is claimed is:

1. A brushless motor, comprising:
a stator having a stator core; and
an upper insulating bobbin connected to an upper face of the stator core, the upper insulating bobbin including a plurality of coil wound portions, and an upper surface of the upper insulating bobbin having a plurality of terminal fixing blocks and a plurality of wire through blocks, each terminal fixing block having a wire-through notch for positioning a wire on the upper insulating bobbin with respect to the coil wound portions and a terminal socket electrically connected with the wire,
wherein a first angle between the wire-through notch of each terminal fixing block and a radial direction of the upper insulating bobbin is 50°-130°, and wherein the terminal socket of each terminal fixing block is inserted into the terminal fixing block to be electrically connected with the wire in the wire-through notch.

2. The brushless motor according to claim 1, further comprising a printed circuit board mounted to the upper insulating bobbin, wherein the terminal socket extends substantially perpendicular relative to the upper surface of the upper insulating bobbin to electrically connect with the printed circuit board.

3. The brushless motor according to claim 1, wherein each terminal fixing block includes a MAG Mate Multispring terminal.

4. The brushless motor according to claim 1, wherein the wire being electrically connected with the terminal socket is oriented in the circumference direction of the upper insulating bobbin at the terminal socket.

5. The brushless motor according to claim 1, further comprising a lower insulating bobbin connected to a lower face of the stator core.

6. The brushless motor according to claim 1, further comprising a rotor rotatably disposed within the stator.

7. The brushless motor according to claim 1, wherein a second angle between a line across an insertion opening of the terminal socket of each terminal fixing block and a circumference direction of the upper insulating bobbin is 50°-130°.

8. The brushless motor according to claim 1, wherein the plurality of coil wound portions includes at least a first coil wound portion, a second coil wound portion, a third coil wound portion, a fourth coil wound portion, a fifth coil wound portion, and a sixth coil wound portion disposed sequentially on the upper insulating bobbin,
wherein the wire is routed into an upper part of the first coil wound portion to be wound around the first coil wound portion,
wherein the wire is routed out of the lower part of the first coil wound portion and into a lower part of the fourth coil wound portion to be wound around the fourth coil wound portion,
wherein the wire is routed out of an upper part of the fourth coil wound portion and into an upper part of the fifth coil wound portion to be wound around the fifth coil wound portion,
wherein the wire is routed out of the lower part of the fifth coil wound portion and into a lower part of the second coil wound portion to be wound around the second coil wound portion,
wherein the wire is routed out of an upper part of the second coil wound portion and into an upper part of the third coil wound portion to be wound around the third coil wound portion, and
wherein the wire is routed out of the lower part of the third coil wound portion and into a lower part of the sixth coil wound portion to be wound around the sixth coil wound portion and routed out from an upper part of the sixth coil.

9. The brushless motor according to claim 8, wherein the wire is routed to the first coil wound portion, the second coil wound portion, the third coil wound portion, the fourth coil wound portion, the fifth coil wound portion, and the sixth coil wound portion as a single wire.

10. The brushless motor according to claim 1, wherein each terminal fixing block is adjacent to one of the coil wound portions in the radial direction of the upper insulating bobbin.

* * * * *